United States Patent
Fusco et al.

(10) Patent No.: US 9,319,755 B2
(45) Date of Patent: Apr. 19, 2016

(54) COMMON DISTRIBUTION AND RENDERING FOR EMERGENCY ALERT SERVICES

(71) Applicant: Verizon Patent and Licensing Inc., Basking Ridge, NJ (US)

(72) Inventors: Daniel C. Fusco, Melrose, MA (US); Michael J. Talbert, Nazareth, PA (US); William S. Downey, Franklin, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 111 days.

(21) Appl. No.: 14/201,339

(22) Filed: Mar. 7, 2014

(65) Prior Publication Data

US 2015/0256902 A1    Sep. 10, 2015

(51) Int. Cl.
  *H04N 7/10*        (2006.01)
  *H04N 7/025*       (2006.01)
  *H04N 21/81*       (2011.01)
  *H04N 21/258*      (2011.01)
  *H04N 21/45*       (2011.01)
  *H04H 20/59*       (2008.01)
  *H04N 21/214*      (2011.01)
  *H04N 21/222*      (2011.01)
  *H04N 21/2381*     (2011.01)
  *H04N 21/61*       (2011.01)

(52) U.S. Cl.
  CPC ............. *H04N 21/814* (2013.01); *H04H 20/59* (2013.01); *H04N 21/214* (2013.01); *H04N 21/2221* (2013.01); *H04N 21/2381* (2013.01); *H04N 21/25841* (2013.01); *H04N 21/4524* (2013.01); *H04N 21/6125* (2013.01)

(58) Field of Classification Search
  USPC ....................................... 725/32, 33
  See application file for complete search history.

(56) References Cited

U.S. PATENT DOCUMENTS

| | | | |
|---|---|---|---|
| 2009/0083813 A1* | 3/2009 | Dolce ...................... | H04N 7/16 725/93 |
| 2011/0159837 A1* | 6/2011 | Daly ..................... | H04H 20/599 455/404.1 |
| 2011/0197223 A1* | 8/2011 | Ravula .................. | H04N 21/814 725/33 |
| 2012/0030703 A1* | 2/2012 | Strong ................... | H04H 20/59 725/33 |
| 2013/0055313 A1* | 2/2013 | Eyer .................... | H04N 21/482 725/49 |

\* cited by examiner

*Primary Examiner* — Pinkal R Chokshi
*Assistant Examiner* — Alexander Gee (57) ABSTRACT

A system and method for are provided for common distribution and rendering of communications capability for emergency alert services. A zone headend device, for a local zone, receives a local emergency alert service (EAS) message that is intended for a particular geographic locality. The zone headend device processes the local EAS message for delivery over a television conditional access system and sends the local EAS message to a regional headend device for a region of multiple zones including the local zone. The regional headend device receives the local EAS message and another local EAS message from another zone headend device. The regional headend device processes the local EAS message and the other local EAS message for in-band delivery with regional programming for broadcast quadrature amplitude modulation (QAM) and over-the-top streaming.

14 Claims, 8 Drawing Sheets

COMMON DISTRIBUTION AND RENDERING FOR EMERGENCY ALERT SERVICES

BACKGROUND

The Emergency Alert System (EAS) is a national public warning system that requires broadcasters, cable television systems, wireless cable systems, and other service providers to provide communications capability for the President to address the American public during a national emergency. The EAS also may be used by state and local authorities to deliver important emergency information, such as AMBER alerts and weather information targeted to specific areas. The current delivery mechanism for EAS on linear content (e.g., a continuous, sequential flow of content) is well-defined using the Emergency Alert Messaging standard from the Society of Cable Telecommunications Engineers (SCTE-18). This methodology is used for service providers and multi-system operators (MSOs).

DETAILED DESCRIPTION OF PREFERRED EMBODIMENTS

The following detailed description refers to the accompanying drawings. The same reference numbers in different drawings may identify the same or similar elements.

Delivery of emergency alert messages for the Emergency Alert System (EAS) is well-defined for broadcast and cable systems. Unfortunately, there are no such clearly-defined standards for delivery of these emergency alert messages for devices accessing content over-the-top (OTT) or for distribution within the home (e.g., using a home media server). OTT content may refer to video content delivered to customer devices via an IP-based packet network. Unlike traditional TV systems, where movies are delivered using broadcasting signals, OTT service today uses dedicated data channels from a backend server to user devices to deliver video content. Since delivery of the emergency alert message for OTT content is non-standard, most mechanisms are severely lacking in robustness, which results in lack of delivery of the emergency alert message.

Systems and methods described herein may specifically integrate the emergency alert message into the video/audio content stream (e.g., an MPEG stream). The integration of the EAS message into all content for delivery over linear (broadcast, cable), OTT, or via IP inside the home can guarantee that the emergency alert message would get to the user device and that a standardized client would be able to be used across all platforms.

According to an implementation, a method may include receiving, by a zone headend device for a local zone, a local emergency alert service (EAS) message that is intended for a particular geographic locality. The method may also include the zone headend device processing the local EAS message for delivery over a television conditional access system and forwarding the local EAS message to a regional headend device for a region of multiple zones including the local zone. The method may further include the regional headend device receiving the local EAS message and another local EAS message from another zone headend device. The method may also include processing, by the regional headend device, the local EAS message and the other local EAS message for in-band delivery with regional programming for broadcast QAM and over-the-top streaming.

Figure 1:
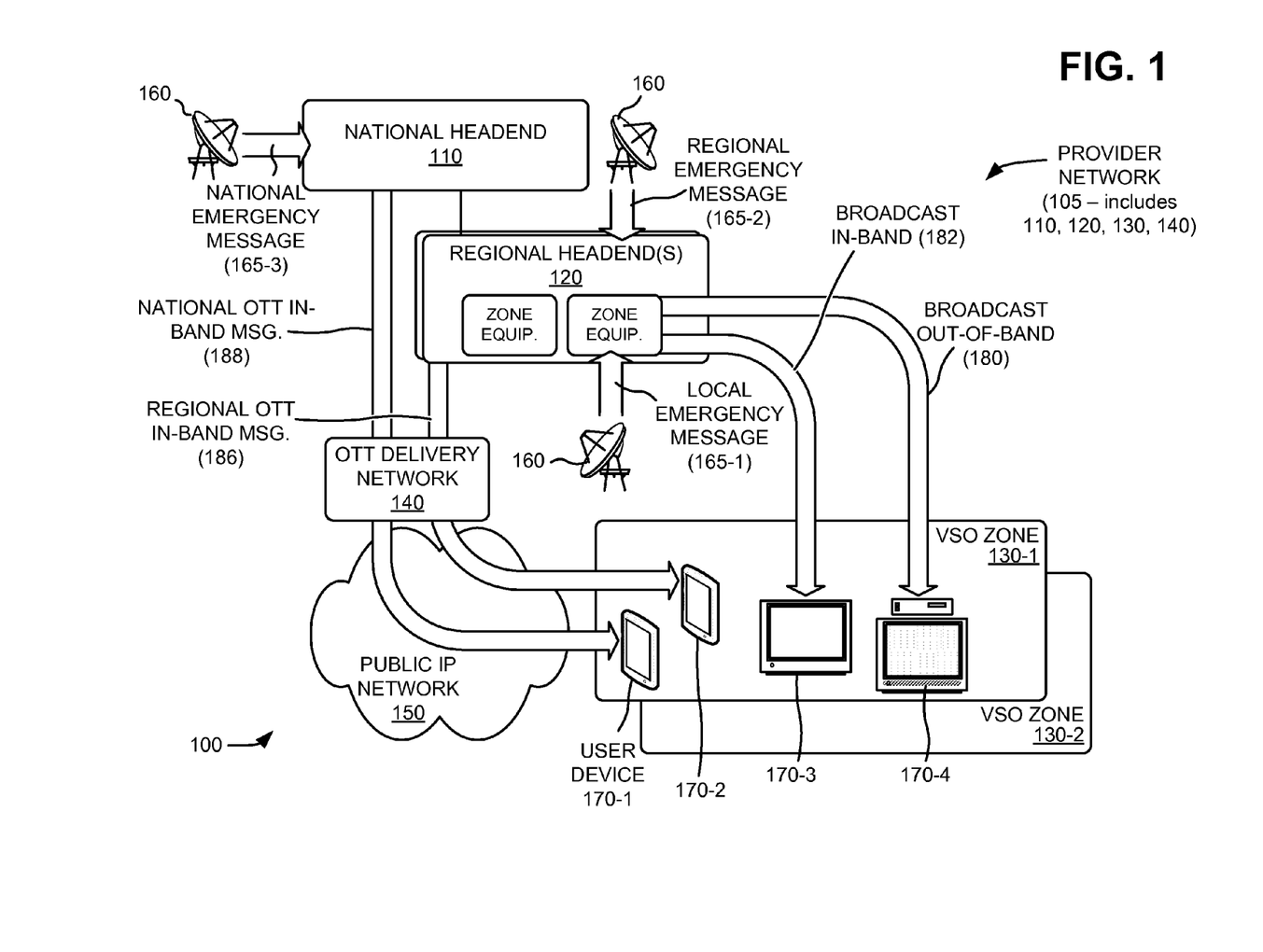
FIG. 1 is an exemplary network environment in which systems and/or methods described herein may be implemented.

FIG. 1 is an exemplary network environment 100 in which systems and/or methods described herein may be implemented. As illustrated, network environment 100 may include a provider network 105 that includes a national headend 110 (also referred to as a super headend), multiple regional headends 120 (also referred to as video hub offices) with equipment for serving multiple video serving office (VSO) zones 130 associated with each of the regional headends 120, and an OTT delivery network 140 (sometimes referred to as an "IP factory"). Network environment 100 may also include an Internet Protocol (IP) network 150 and one or more emergency message sources 160 (collectively "emergency message sources 160" and individually "emergency message source 160") to provide local emergency messages 165-1, regional emergency messages 165-2, and national emergency messages 165-3 (collectively "emergency messages 165" and generically "emergency message 165"). Provider network 105 may distribute content and emergency messages 165 to user devices 170-1 through 170-N (collectively "user devices 170" and individually "user device 170").

National headend 110 may include network elements that ingest programs on a national level. National headend 110 may aggregate, process, encode, and distribute programs to regional headends 120. Regional headends 120 may include network elements that ingest programs on a regional level and a local level. Regional headends 120 may also provide on-demand services, etc. VSO zones 130 may each include a VSO with network elements to distribute programs to user devices 170, within a respective VSO zone 130, via access networks. VSO zone 130 may represent a particular geographical or broadcast area serviced by a VSO. As described further herein, each of national headend 110 and regional headends 120, and VSO zones 130 may include encoders/decoders (ENDECs), multiplexers, routers, servers, storage devices, and other equipment to facilitate delivery of video content and EAS messages to user devices 170.

OTT delivery network 140 may include network devices to transcode (or convert) video content to a format that may be distributed over public IP network 150 and presented by user devices 170. For example, OTT delivery network 140 may include a server that provides streaming data (e.g., via a streaming universal resource locator (URL)) to user devices 170 (e.g., via public IP network 150).

Public IP network 150 may include the Internet; a local area network (LAN); an intranet; a wide area network (WAN), such as a cellular network, a satellite network, a fiber optic network, a private WAN, or a combination of the Internet and a private WAN; etc., that is used to transport data. Although shown as a single element of network environment 100 in FIG. 1, public IP network 150 may include a number of separate networks that function to provide services to user devices 170.

Message sources 160 may include any satellite, internet device, or other communication device to provide EAS messages to national headend 110, regional headend 120, or devices servicing VSO zones 130. As shown in FIG. 1, message sources 160 may provide national emergency message 165-3 to national headend 110, may provide regional emergency message 165-2 to regional headend 120, and may provide local emergency message 165-1 to regional headend 120 zone equipment serving VSO zone(s) 130.

User device 170 may include a computational or communication device that is capable of communicating with devices in national headend 110, regional headend 120, VSO zones 130, or OTT delivery network 140. In some implementations, user device 170 may enable a user to communicate with other devices to select, receive, and present video content to a user. User device 170 may include, for example, a mobile communication device (e.g., a smart phone), a tablet computer, a personal computer, a laptop computer, a gaming console, an Internet television, a set-top box (STB), a home media server, or other types of computation or communication devices. In one implementation, user device 170 may include an application (or client) that enables user device 170 to communicate with, for example, OTT delivery network 140 to receive OTT content. As described further herein, user devices 170 may be configured to identify EAS signals (e.g., based on emergency messages 165) in content provided from national headend 110 or regional headend.

As described further herein, provider network 105 may support delivery of emergency messages 165 to different user devices 170 in each VSO zone 130 via broadcast out-of-band 180 service, via broadcast in-band service 182, via regional OTT in-band service 186, or via national OTT in-band service 188. Thus, conventional cable and broadcast users can receive EAS alerts through in-band and out-of-band cable delivery systems. User devices 170 receiving regional content via OTT delivery may receive zone-specific EAS alerts when located within the relevant zone. Conversely, user devices 170 receiving regional content via OTT delivery may ignore zone-specific EAS alerts when located outside the relevant zone.

In FIG. 1, the particular arrangement and number of components of network environment 100 are illustrated with simplicity to enhance clarity of presentation. In practice there may be more headends, devices, and/or networks to facilitate delivery of content to user devices. Components of network environment 100 may be connected via wired and/or wireless links.

Figure 2:
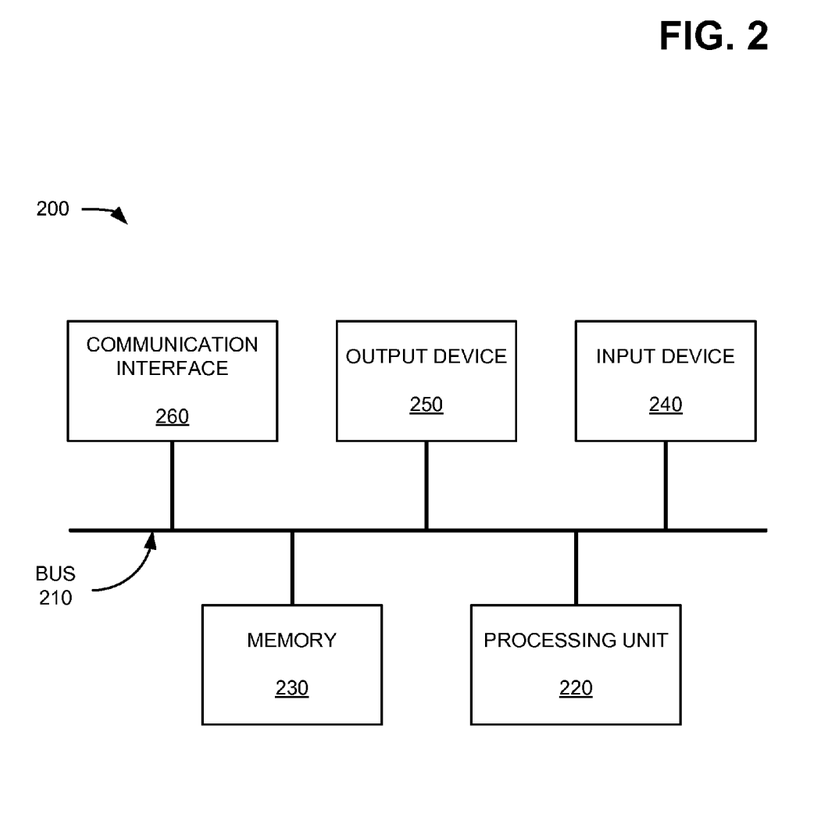
FIG. 2 is a block diagram of exemplary components of a device that may correspond to one of the devices of FIG. 1.

FIG. 2 is a diagram of exemplary components of a device 200. Devices in national headend 110, regional headends 120, video serving office (VSO) zones 130, OTT delivery network 140, public IP network 150, and/or user devices 170 may each be the same as, or similar to, device 200 and may each be implemented/installed as software, hardware, or a combination of hardware and software. In one implementation, device 200 may be configured as a network device. In another implementation, device 200 may be configured as a computing device. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100. Each of such other devices of environment 100 may include its respective communication interface 260 to achieve such communication.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. As an example, in some implementations, a display may not be included in device 200. In these situations, device 200 may be a "headless" device that does not include an input device. Alternatively, or additionally, one or more components of device 200 may perform one or more other tasks described as being performed by one or more other components of device 200.

Figure 3:
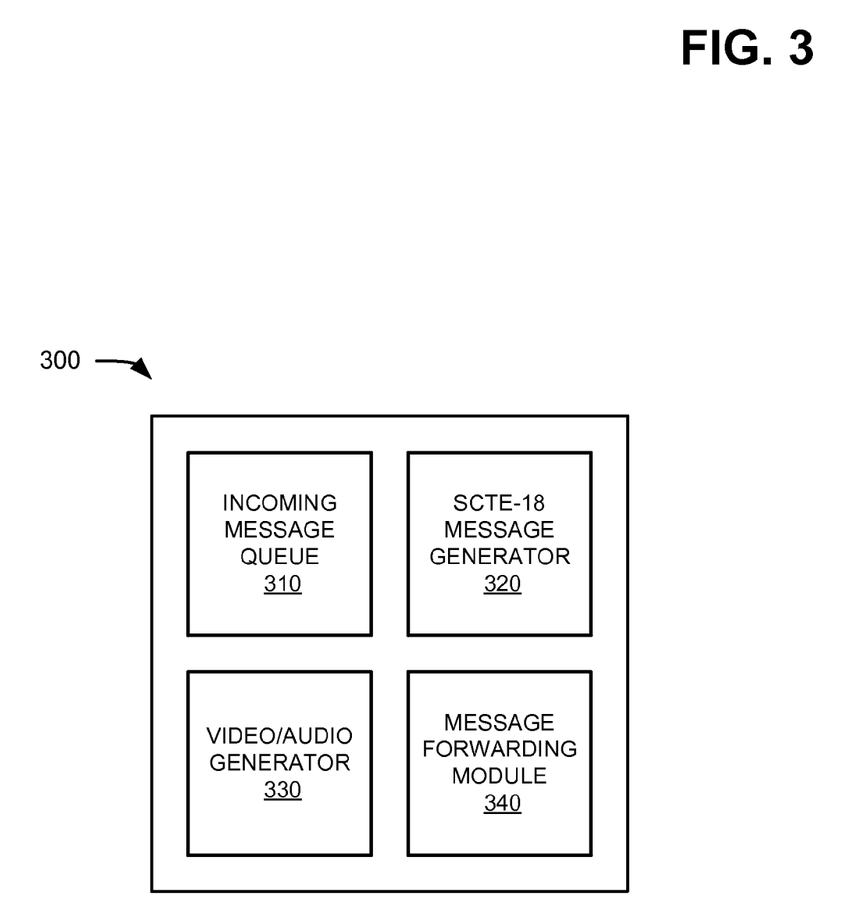
FIG. 3 is a block diagram of exemplary functional components of an encoder/decoder that may be included in the national headend and/or regional headend of FIG. 1.

FIG. 3 is a block diagram of exemplary functional components of an encoder/decoder (ENDEC) 300 that may be included in the national headend 110 and/or regional headend 120. As shown in FIG. 3, ENDEC 300 may include an incoming message queue 310, an SCTE-18 message generator 320, a video/audio generator 330, and a message forwarding module 340.

Incoming message queue 310 may buffer incoming Emergency Alert System (EAS) messages for processing. Incoming EAS messages may be received at national headend 110, regional headend 120, or VSO zone, for example, from an outside source or from another ENDEC 300.

SCTE-18 message generator 320 may process the EAS message received at ENDEC 300 into a format compatible with industry standard SCTE-18, Emergency Alert Messaging. The SCTE-18 format is generally designed to deliver emergency alert signals over cable TV systems to signal emergencies to digital receiving devices such as digital set-top boxes, digital TV receivers, and digital video recorders. The SCTE-18 message may include, among other information, a relevant zone identifier (a Federal Information Processing Standards or FIPS code) for the emergency alert and a private descriptor field that includes a location (e.g., a source identifier, such as a uniform resource locator (URL) or channel) where client devices can obtain emergency information relevant to EAS message. According to an implementation described herein, the location may correspond to a dedicated URL or channel for broadcasting emergency information to a particular VSO zone 130.

Video/audio generator 330 may generate video and audio information from the EAS message received at ENDEC 300. The video and audio information may include information intended for eventual presentation to viewers on user devices 170. For example, the video and audio information may eventually be included for presentation in the dedicated URL or channel for broadcasting emergency information to a particular VSO zone 130. Video and audio information generated and/or extracted by video/audio generator 330 may include, for example, a text crawl, an audio message (reciting the text crawl or additional information), header codes (e.g., start/end codes, etc.), images, video clips, etc.

Message forwarding module 340 may request EAS messages from other lower-level ENDECs 300 and/or forward EAS messages to other higher-level ENDECs 300. For example, a zone-level ENDEC 300 (e.g., for a VSO zone 130) may forward an EAS message to a regional-level ENDEC 300 (e.g., at regional headend 120). As another example, the regional-level ENDEC 300 may forward the EAS message to a national-level ENDEC 300 (e.g., at national headend 110). In one implementation, a message forwarding module 340 in one ENDEC 300 may send polling signals (e.g., at regular, periodic intervals) to message forwarding modules 340 in lower-level ENDECs 300. In response to a polling signal, a message forwarding module 340 in the lower-level ENDEC 300 may provide an indication, to the message forwarding modules 340 in the higher-level ENDEC 300, that a local EAS message has been received. Upon receiving a positive response to the polling signal, the message forwarding modules 340 in the higher-level ENDEC 300 may issue a request (e.g., an HTTP GET request) to the message forwarding modules 340 in the lower-level ENDEC 300, causing the message forwarding module 340 in the lower-level ENDEC 300 to forward the local EAS message. As described further herein, message forwarding module 340 may ensure that zone-level EAS messages are forwarded for inclusion in regional and national live linear broadcast content to trigger presentation to viewers of such content using OTT delivery in the relevant zone.

Although FIG. 3 shows exemplary functional components of ENDEC 300, in other implementations, ENDEC 300 may include fewer components, different components, or additional components than those depicted in FIG. 3. Alternatively, or additionally, tasks of one or more functional components of ENDEC 300 may be performed by one or more other devices.

Figure 4:
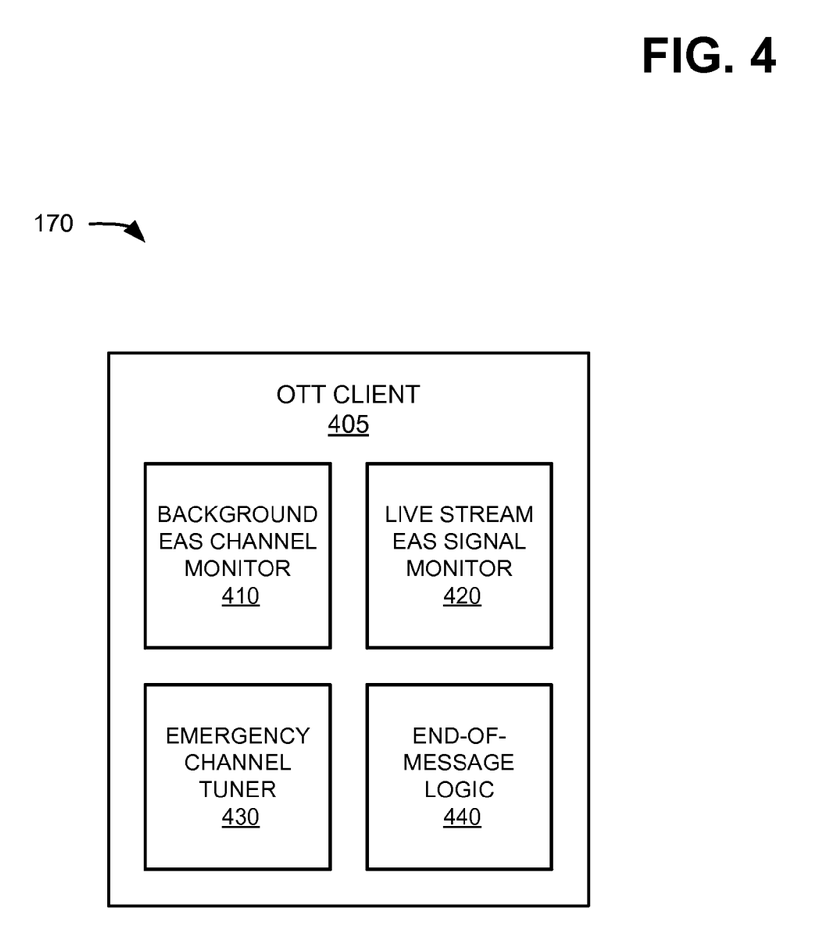
FIG. 4 is a block diagram of exemplary functional components of a user device of FIG. 1.

FIG. 4 is a block diagram of exemplary functional components of user device 170. As shown in FIG. 4, user device 170 may include an OTT client 405 with a background EAS channel monitor 410, a live stream EAS signal monitor 420, an emergency channel tuner 430, and end-of-message logic 440.

OTT client 405 may generally enable user device 170 to present OTT content delivered via public network 150. In another implementation, OTT client 405 may be a standalone device that includes background EAS channel monitor 410, live stream EAS signal monitor 420, emergency channel tuner 430, and end-of-message logic 440.

Background EAS channel monitor 410 may screen an emergency channel for emergency signals. For example, background EAS channel monitor 410 may look for in-band EAS message signals in a live stream of the emergency channel. Background EAS channel monitor 410 may scan the emergency channel for an emergency signal with a FIPS code that corresponds to the current location of user device 170. Background EAS channel monitor 410 may operate in the background when OTT client 405, operating on user device 170, is not receiving live linear content on another stream. For example, background EAS channel monitor 410 may be activated when OTT client 405 tunes to an interactive media guide (IMG) and may be deactivated when the user elects to view particular live linear content.

Live stream EAS signal monitor 420 may screen live linear content for emergency signals. For example, live stream EAS signal monitor 420 may look for in-band EAS message signals in a live streaming selection (e.g., live linear content selected by a user of user device 170). Live stream EAS signal monitor 420 may scan the live streaming selection for an emergency signal with a FIPS code that corresponds to the current location of user device 170. Live stream EAS signal monitor 420 may be activated when OTT client 405 tunes to any live linear content stream and may be deactivated when OTT client 405 tunes away from a live linear content stream.

Emergency channel tuner 430 may automatically cause OTT client 405 to tune to a designated emergency channel when background EAS channel monitor 410 or live stream EAS signal monitor 420 detects a relevant EAS message signal (e.g., with a FIPS code that corresponds to the current location of user device 170). In one implementation, emergency channel tuner 430 may tune to a URL identified in the relevant EAS message. In another implementation, emergency channel tuner 430 may include logic to identify and tune to an alternate URL if the URL identified in the relevant EAS message is not accessible. For example, as described further herein the emergency channel tuner may use a URL from a national headend (e.g., national headend 110) if a URL from a regional headend (e.g., regional headend 120) is not available.

End-of-message logic 440 may monitor an emergency message presentation and include logic to return a user to another presentation or content when an emergency message is completed. For example, when an end-of-message signal is detected (e.g., by end-of-message logic 440 or another component of OTT client 405), end-of-message logic 440 may cause OTT client 405 to perform a default action. The default action may include, for example, returning to the channel/stream previously being presented to the user (e.g., before the emergency content), returning to a home screen for the IMG, or providing an option screen for a user to select from a list of options, for example, from the IMG, the previous channel, or another channel. In one implementation, the default action may be user-configurable.

Although FIG. 4 shows exemplary functional components of user device 170, in other implementations, user device 170 may include fewer components, different components, or additional components than those depicted in FIG. 4. Alternatively, or additionally, tasks of one or more functional components of user device 170 may be performed by one or more other devices.

Figure 5A:
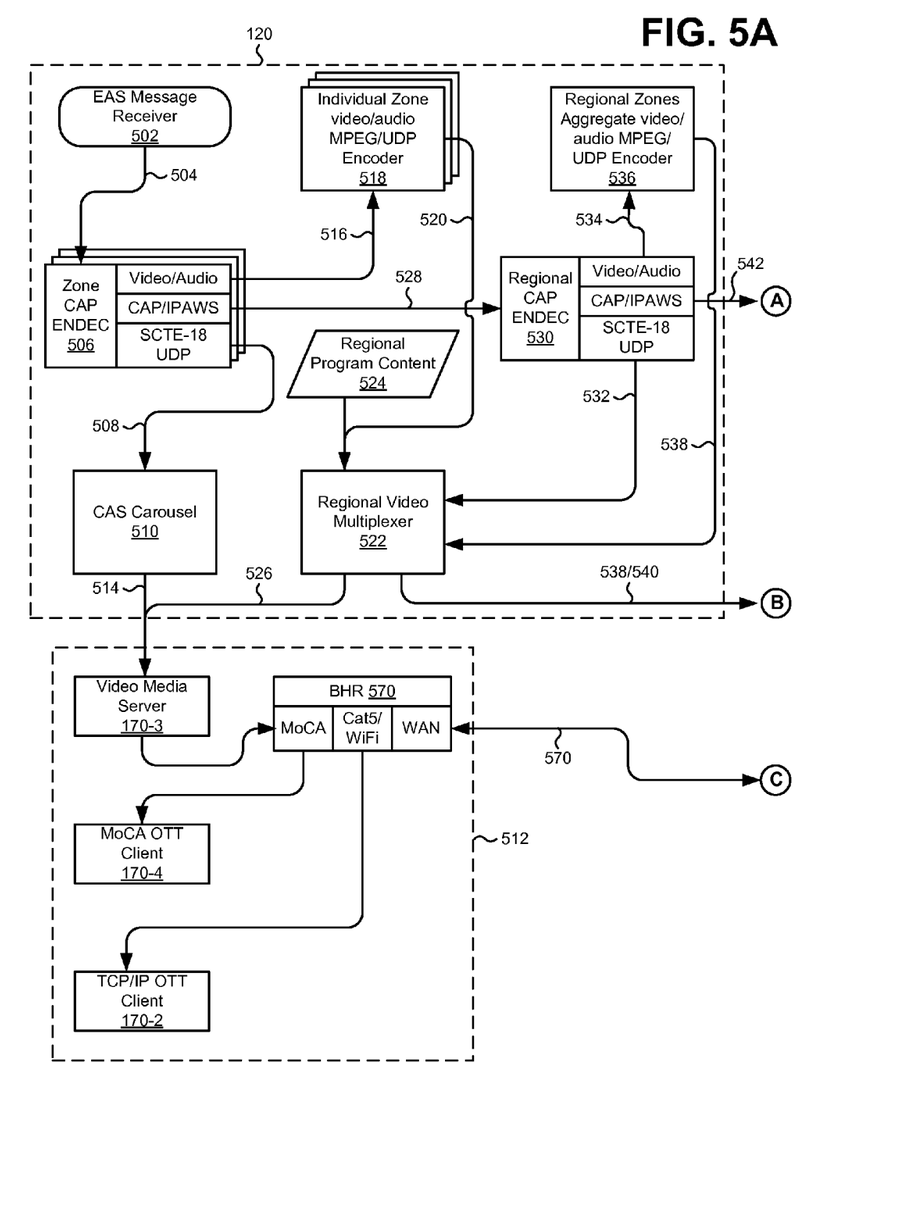
FIGS. 5A and 5B are a diagram of exemplary communications among devices and systems in a portion of the network environment of FIG. 1.
Figure 5B:
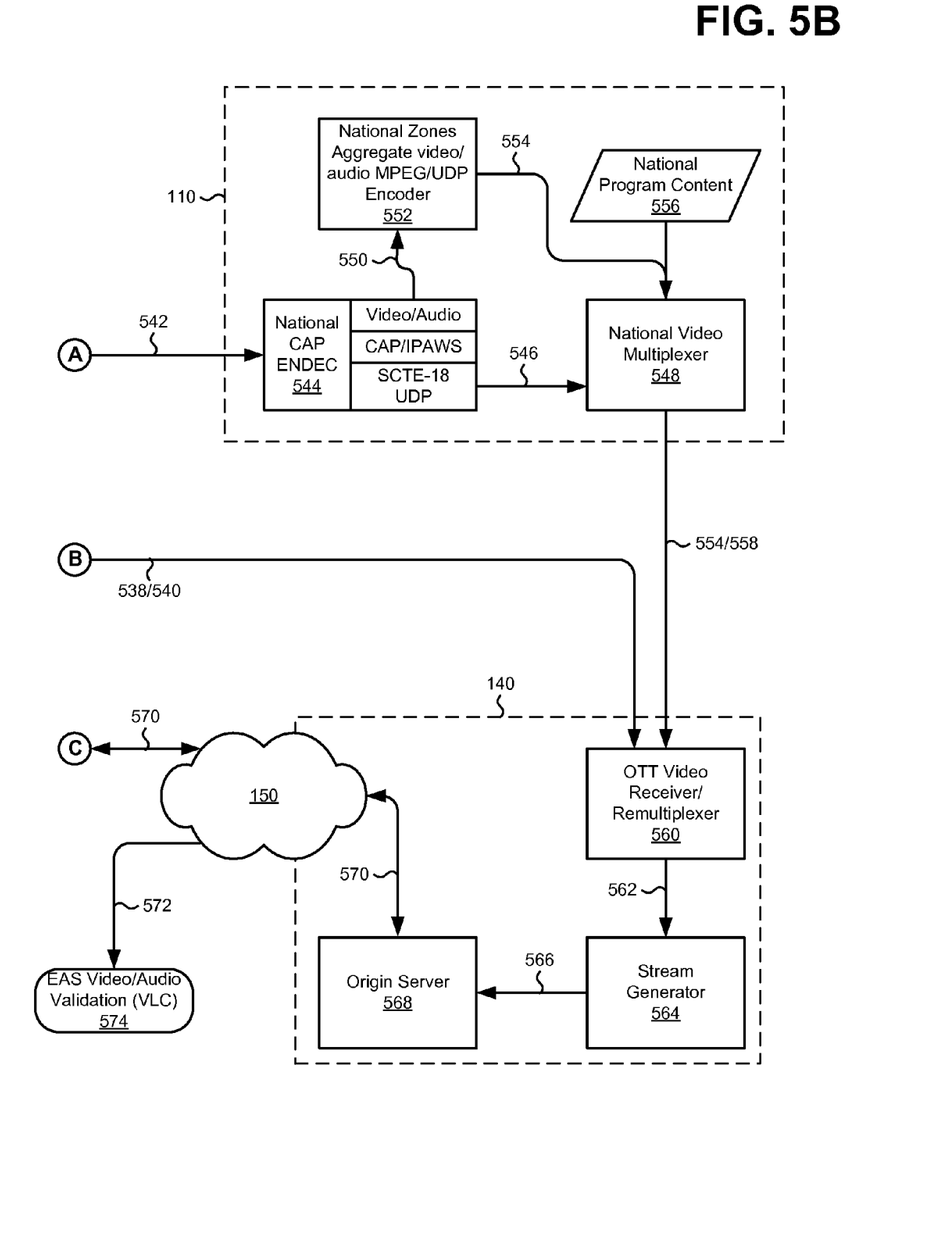

FIGS. 5A and 5B provide a diagram of communications among devices in network environment 100. Communications shown in FIGS. 5A and 5B illustrate how zone-specific EAS messages may be provided to user devices 170 and presented (or rendered) by the user devices 170 in only the relevant zones. The following discussion of FIGS. 5A and 5B also makes reference to functionality, subsystems or devices of FIG. 1.

Referring to FIG. 5A, EAS message receiver 502, associated with zone equipment for a particular VSO zone 130 (e.g., VSO zone 130-1) may receive a local EAS message 504 (which may correspond to local emergency message 165-1 of FIG. 1) from one of message sources 160. EAS message receiver 502 may include an antenna, a network (e.g., internet) connection, or a dedicated interface, to receive EAS messages for a particular VSO zone 130.

EAS message 504 may include an emergency message intended for distribution to particular zones or regions. EAS message 504 may use audio frequency-shift keying (AFSK) to notify the receiving office of the type of emergency, locations affected, and the time of issue for EAS message 504 (e.g., without the actual audio/text of the alert). EAS message 504 may also use common alerting protocol (CAP) to provide text, photos, videos, or audio related to EAS message 504. EAS message receiver 502 may deliver EAS message 504 to one or more dedicated CAP encoder/decoder (ENDEC) devices (referred to herein as zone CAP ENDEC 506) serving the different VSO zones 130. In one implementation, EAS message receiver 502 may be an integral component of zone CAP ENDEC 506, such that a separate EAS message receiver 502 is used for each zone CAP ENDEC 506.

Each zone CAP ENDEC 506 (for which EAS message 504 is relevant) may use information from EAS message 504 to generate different types of emergency signals. As described further herein, zone CAP ENDEC 506 may generate an SCTE-18 Emergency Alert Message for cable broadcasts, extract EAS video and audio data for retrieval/distribution, and forward CAP information to other ENDECs via Integrated Public Alert and Warning System (IPAWS) channels. While FIGS. 5A and 5B primarily describe a single zone CAP ENDEC 506 for simplicity, in practice, multiple zone CAP ENDECs 506 may generate different emergency signals based on different EAS messages 504.

Zone CAP ENDEC 506 may use information in EAS message 504 to generate an SCTE-18 message that includes, among other signals, the relevant FIPS code and a private descriptor that includes a location (e.g., a uniform resource locator (URL) or channel) where client devices can obtain emergency information relevant to EAS message 504. As indicated by reference 508, the SCTE-18 message may be provided in a user datagram protocol (UDP) packet stream (e.g., MPEG stream) to a conditional access system (CAS) carousel 510 that is associated with the particular VSO zone 130. CAS carousel 510 may receive SCTE-18 UDP stream 508 and add the SCTE-18 message to an out-of-band carrier to deliver to user devices (e.g., user devices 170) on customer premises 512, which may be within a particular VSO zone 130. Particularly, as indicated by reference 514, CAS carousel 510 may interleave information from SCTE-18 UDP stream 508 with other CAS data for delivery to user devices 170 that are connected to receive cable broadcasts from the service provider network 105, such as a video media server.

As indicated by reference 516, zone CAP ENDEC 506 may generate a composite of the audio and video information from EAS message 504. Composite audio/video 516 may include, for example, a text crawl, audio messages, header codes (e.g., start/end codes), images, video clips, etc. Zone CAP ENDEC 506 may provide composite audio/video 516 to an individual zone video/audio MPEG/UDP encoder 518. Encoder 518 may be located, for example, within regional headend 120. Encoder 518 may receive composite audio/video 516 and re-format the signals into an audio/video MPEG/UDP stream 520.

Audio/video MPEG/UDP stream 520 can be provided to a regional video multiplexer 522. Regional video multiplexer 522 may generally provide regional programming for distribution to either of user devices (e.g., user devices 170) on customer premises 512 or to customers using OTT content delivery. Regional video multiplexer 522 may receive regional program content 524 that may be distributed to multiple VSO zones 130 associated with regional headend 120. Regional program content 524 may include, for example, programming for specific areas and/or time zones, such as local public broadcasting station (PBS) content. Regional video multiplexer 522 may also distribute regional program content 524 for distribution via OTT delivery network 140. Thus, the geographic distribution of regional program content 524 may not correspond to the required distribution of an EAS message. More particularly, the geographic distribution of regional program content 524 may be much broader than the relevant VSO zone 130 for an EAS message.

Based on zone information (e.g., a FIPS code) included in audio/video MPEG/UDP stream 520, regional video multiplexer 522 may multiplex regional program content 524 with audio/video MPEG/UDP stream 520 to create a combined in-band stream for a specific VSO zone 130 that corresponds to the FIPS code for EAS message 504. As shown with reference 526, the combined in-band stream for the particular zone may be provided to user devices 170 that are connected to receive cable broadcasts from the service provider network 105, such as a video media server 170.

As indicated by reference 528, zone CAP ENDEC 506 may forward EAS message 504 via CAP and/or IPAWS channels to a regional CAP ENDEC 530. Regional CAP ENDEC 530 may poll for and/or receive forwarded EAS messages 528 from multiple zone CAP ENDECs 506. (Although not shown in FIG. 5A, regional CAP ENDEC 530 may also receive region-specific EAS messages, such as regional emergency message 165-2, directly from another source.) Regional CAP ENDEC 530 may process each forwarded CAP message 528 (e.g., in serial fashion) and generate an aggregate SCTE-18 UDP stream 532. Aggregate SCTE-18 UDP stream 532 may include, for example, a serial string of SCTE-18 messages. Each SCTE-18 message in aggregate SCTE-18 UDP stream 532 may include the relevant FIPS code and a private descriptor that includes a location (e.g., a URL) of emergency information for the relevant VSO zone. The location/URL used in the private descriptor of the regional SCTE-18 messages from regional CAP ENDEC 530 may be a different URL than that used in the SCTE-18 message from zone CAP ENDEC 506. Aggregate SCTE-18 UDP stream 532 may be forwarded to regional video multiplexer 522.

As indicated by reference 534, regional CAP ENDEC 530 may generate a composite of the audio and video information from each forwarded EAS message 528. Composite audio/video 534 may include, for example, a text crawl, audio messages, header codes (e.g., start/end codes), images, video clips, etc. Regional CAP ENDEC 530 may provide composite audio/video 534 to a regional zone aggregate video/audio MPEG/UDP encoder 536. Encoder 536 may receive composite audio/video 534 and re-format the signals into an audio/video MPEG/UDP stream 538.

Regional video multiplexer 522 may receive aggregate SCTE-18 UDP stream 532 and audio/video MPEG/UDP stream 538. Regional video multiplexer 522 may multiplex regional program content 524 with aggregate SCTE-18 UDP stream 532 to create a combined regional in-band stream that includes sequences of zone-specific SCTE-18 messages. The combined regional in-band stream that includes sequences of zone-specific SCTE-18 messages, indicated by reference 540, may be forwarded with audio/video MPEG/UDP stream 538 to OTT delivery network 140 (tab B to FIG. 5B). As described further herein, information in combined regional in-band stream 540 may eventually direct user devices 170 (e.g, including an OTT client) to tune to particular segments from audio/video MPEG/UDP stream 538 to obtain zone-specific emergency messages based on, for example, a user location and corresponding FIPS codes.

Processing of zone-specific EAS messages (e.g., EAS message 504) by regional headend(s) 120, as described above, can ensure that zone-specific EAS messages are provided to customers in the relevant VSO zone(s) 130 via broadcast out-of-band signals, via broadcast in-band signals, and in regional OTT programming. Additional processing of the zone-specific messages can be performed by national headend 110 to ensure that viewers (in the relevant VSO zone(s) 130) of national content also receive the zone-specific EAS messages.

As indicated by reference 542, regional CAP ENDEC 530 may forward forwarded CAP message 528, via CAP and/or IPAWS channels, to a national CAP ENDEC 544 (tab A to FIG. 5B). Referring to FIG. 5B, national CAP ENDEC 544 may poll for and/or receive forwarded CAP messages 542 from multiple regional CAP ENDECs 530. (Although not shown in FIG. 5B, national CAP ENDEC 5440 may also receive national EAS messages, such as national emergency message 165-3, directly from another source.) National CAP ENDEC 544 may process each forwarded CAP message 542 (e.g., in serial fashion) and generate a national zones aggregate SCTE-18 UDP stream 546. Aggregate SCTE-18 UDP stream 546 may include, for example, a serial string of SCTE-18 messages. Each SCTE-18 message in aggregate SCTE-18 UDP stream 546 may include a relevant FIPS code (e.g., for a particular zone or region) and a private descriptor (e.g., a URL) for obtaining emergency information for the relevant VSO zone. The location/URL used in the private descriptor of the national SCTE-18 messages from national CAP ENDEC 544 may be a different URL than that used in the regional SCTE-18 message from regional CAP ENDEC 530. Aggregate SCTE-18 UDP stream 546 may be forwarded to national video multiplexer 548.

As indicated by reference 550, national CAP ENDEC 544 may generate a composite of the audio and video information from each forwarded EAS message 542. Composite audio/video 550 may include, for example, a text crawl, audio messages, header codes (e.g., start/end codes), images, video clips, etc. Composite audio/video 550 may be associated with a corresponding URL in the national SCTE-18 message from national CAP ENDEC 544. National CAP ENDEC 544 may provide composite audio/video 550 to a national zone aggregate video/audio MPEG/UDP encoder 552. Encoder 552 may receive composite audio/video 550 and re-format the signals into an audio/video MPEG/UDP stream 554.

National video multiplexer 548 may receive aggregate SCTE-18 UDP stream 546 and audio/video MPEG/UDP stream 554. National video multiplexer 548 may multiplex national program content 556 with aggregate SCTE-18 UDP stream 546 to create a combined national in-band stream that includes sequences of zone-specific SCTE-18 messages in the national programs. The combined national in-band stream that includes sequences of zone-specific SCTE-18 messages, indicated by reference 558, may be forwarded with audio/video MPEG/UDP stream 554 to OTT video receiver/remultiplexer 560 in OTT delivery network 140. Information in national combined in-band stream 558 may eventually direct user devices 170 (e.g., with an OTT client) to tune to a particular URL to obtain zone-specific segments from audio/video MPEG/UDP stream 554.

Still referring to FIG. 5B, OTT video receiver/remultiplexer 560 in OTT delivery network 140 may receive audio/video MPEG/UDP stream 538, combined regional in-band stream 540, audio/video MPEG/UDP stream 554, and combined national in-band stream 558. As indicated by reference 562, OTT video receiver/remultiplexer 560 may provide the regional and/or national programs to stream generator 564.

Stream generator 564 may generate an HTTP transport stream of content for distribution to OTT clients (e.g., residing on user devices 170). In one implementation, stream generator 564 may provide content chunks for delivery to user devices 170. For example, stream generator 564 may receive content (such as audio/video MPEG/UDP stream 538, combined regional in-band stream 540, audio/video MPEG/UDP stream 554, and combined national in-band stream 558) from OTT video receiver/remultiplexer 560 and may divide the content into multiple pieces (e.g., content chunks) 566. Content chunks 566 may be sent to origin server 568 to deliver to user devices 170 upon request. In one implementation, stream generator 564 may also generate an index of the chunks and may provide the index to origin server 568.

Origin server 568 may buffer content, such as content chunks 566, that may be delivered to user devices 170. The content may include, for example, content from audio/video MPEG/UDP stream 538, combined regional in-band stream 540, audio/video MPEG/UDP stream 554, or combined national in-band stream 558. Origin server 568 may deliver the buffered content as live linear content, such that programming may be made available, by origin server 568, in real-time or near real-time relative to the original broadcast of the television programming.

Referring collectively to FIGS. 5A and 5B, user devices 170 in customer premises 512 may receive EAS messages when viewing content from any of several delivery methods. For cable broadcast programming, broadcast out-of-band EAS message delivery for each VSO Zone 130 is provided via CAS carousel 510 and regional video multiplexer 522 using quadrature amplitude modulation (QAM). Alternatively, broadcast in-band EAS message delivery is provided on a regional basis via regional CAP ENDEC 530 and regional video multiplexer 522 using QAM.

For live linear OTT programming, delivery of EAS messages in regional OTT programming is supported via in-band EAS messaging from regional CAP ENDEC 530 and streams 538/540. A regional OTT URL to obtain emergency message content is defined in the private descriptor field of the SCTE-18 message 532 from regional CAP ENDEC 530. Alternatively, delivery of EAS messages in national OTT programming is supported via in-band EAS messaging from national CAP ENDEC 544 and streams 554/558. A national OTT URL to obtain emergency message content is defined in the private descriptor field of the SCTE-18 message 546 from national CAP ENDEC 544.

As indicated by reference 570, user devices 170 that consume OTT content may communicate with origin server 568 via a broadband home router (BHR) 572 (and/or other network devices) and public IP network 150. When presenting OTT content, user device 170 may receive the requested regional programming (originating from regional program content 524) or national programming (originating from national programs 556). User devices 170 may screen OTT content streams for embedded EAS message signals (e.g., regional SCTE-18 message 532 or national SCTE-18 message 546). If user device 170 identifies an embedded EAS signal, user device 170 may determine if there is a relevant FIPS code for the current location of user device 170. If there is no relevant FIPS code, the EAS message can be ignored by the user device 170. If there is a relevant FIPS code, the user device 170 may identify the URL from the private descriptor field of the embedded EAS signal and access that URL to present emergency message content from origin server 568. The URL may provide access to content from regional audio/video MPEG/UDP stream 538 or national audio/video MPEG/UDP stream 554. Use of separate URLs for the regional-level EAS signal and the national-level EAS signal may promote load balancing.

As indicated by reference 574, origin server 568 may also provide content from audio/video MPEG/UDP stream 538 or audio/video MPEG/UDP stream 554 to an EAS video/audio validation unit 576. EAS video/audio validation unit 576 may verify that EAS video/audio content from each URL is accessible and viewable via OTT clients.

Referring again to FIG. 1, network environment 100 may also support delivery of regional emergency messages 165-2 and national emergency messages 165-3. Regional emergency messages 165-2 and national emergency messages 165-3 may include, for example, emergency action notification (EAN) messages, such as a national presidential address. As shown in FIG. 1, regional emergency messages 165-2 may be received at regional headend 120 and national emergency messages 165-3 may be received at national headend 130.

Regional emergency messages 165-2 may be processed by regional CAP ENDEC 530 in a similar manner as forwarded CAP message 528, and national emergency messages 165-3 may be processed by national CAP ENDEC 544 in a similar manner as forwarded CAP message 542, as shown in FIGS. 5A and 5B. The zone designation (or FIPS code) for regional emergency messages 165-2 and national emergency messages 165-3 may be a regional or national identifier. Thus, all user devices 170 in a region that encounter the regional zone identifier (e.g., in-band in OTT live linear content) would automatically tune to the corresponding URL for the regional emergency message. Similarly, all user devices 170 that encounter the national zone identifier would automatically tune to the corresponding URL for the national emergency message. In the case of an EAN message, the content from the URL for the regional emergency message and content from the URL for the national emergency message would be the same.

Figure 6:
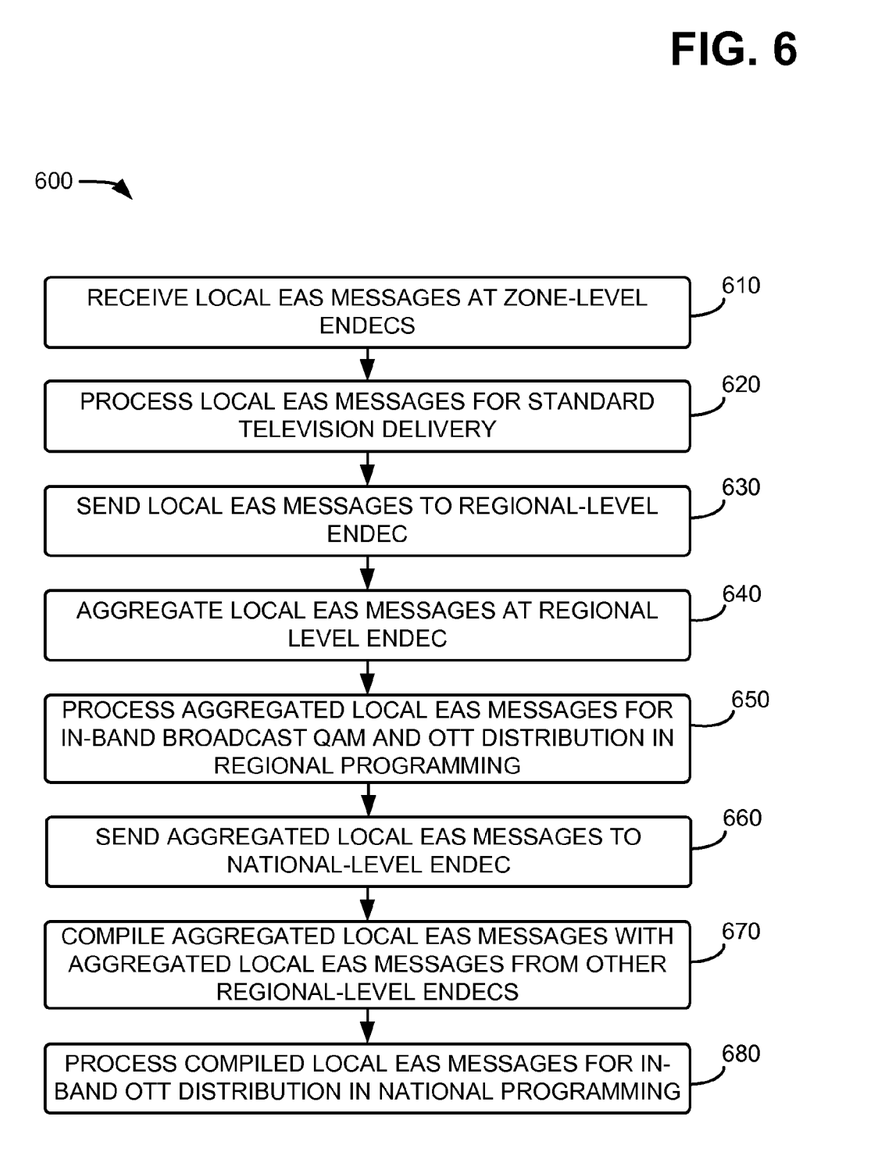
FIG. 6 is a flow diagram of an exemplary process for distributing local EAS messages to both standard cable television systems and over-the-top (OTT) clients.

FIG. 6 is a flow diagram of an exemplary process 600 for distributing local EAS messages to both standard cable television systems and OTT clients. In one implementation process 600 may be performed by multiple headend devices (e.g., zone CAP ENDEC 506, regional CAP ENDEC 530, and national CAP ENDEC 544) in a provider network (e.g., provider network 105). In other implementations, process 600 may be performed by one or more devices from provider network 105 and/or user devices 170.

Process 600 may include receiving local EAS messages at zone-level ENDECs (block 610) and processing the local EAS messages for standard television delivery (block 620). For example, referring to FIG. 5A, zone CAP ENDEC 506 may receive an EAS message (e.g., local EAS message 504) which is intended for distribution over a local geographic (or broadcast) zone. Zone CAP ENDEC 506 may process the message as an SCTE-18 message for out-of-band delivery to user devices 170 (e.g., a STB or video media server) in customer premises 512. Additionally, or alternatively, zone CAP ENDEC 506 may process audio and video content from EAS message 504 for in-band presentation to user devices 170 in customer premises 512.

Process 600 may also include sending the local EAS messages to a regional-level ENDEC (block 630), aggregating local EAS messages at the regional-level ENDEC (block 640), and processing the aggregated local EAS messages for in-band broadcast QAM and OTT distribution in regional programming (block 650). For example, referring again to FIG. 5A, zone CAP ENDEC 506 may receive a polling signal from regional CAP ENDEC 530 and provide an indication that a local EAS message has been received. Upon receiving a positive response to the polling signal, regional CAP ENDEC 530 may issue a request to zone CAP ENDEC 506, causing zone CAP ENDEC 506 to forward EAS message 504. In one implementation, zone CAP ENDEC 506 may forward EAS message 504 via CAP and/or IPAWS channels to a regional CAP ENDEC 530. Regional CAP ENDEC 530 may receive forwarded EAS messages 528 from multiple zone CAP ENDECs 506 and may process each forwarded CAP message 528 (e.g., in serial fashion) to generate an aggregate SCTE-18 UDP stream 532. Aggregate SCTE-18 UDP stream 532 may be forwarded to regional video multiplexer 522 for eventual distribution through OTT delivery network 140.

Process 600 may further include sending the aggregated local EAS messages to national-level ENDC (block 660). For example, as shown in FIGS. 5A-5B, regional CAP ENDEC 530 may forward forwarded CAP message 528, via CAP and/or IPAWS channels, to a national CAP ENDEC 544 (e.g., in response to polling/request exchange), as indicated by reference 542.

Process 600 may additionally include compiling the aggregated local EAS messages with aggregated local EAS messages from other regional-level ENDECS (block 670) and processing the compiled local EAS messages for in-band OTT distribution in national programming (block 680). For example, referring back to FIG. 5B, national CAP ENDEC 544 may receive forwarded CAP messages 542 from multiple regional CAP ENDECs 530 and may process each forwarded CAP message 542 (e.g., in serial fashion) to generate a national zones aggregate SCTE-18 UDP stream 546. Aggregate SCTE-18 UDP stream 546 may be forwarded to national video multiplexer 548 for eventual distribution through OTT delivery network 140.

Figure 7:
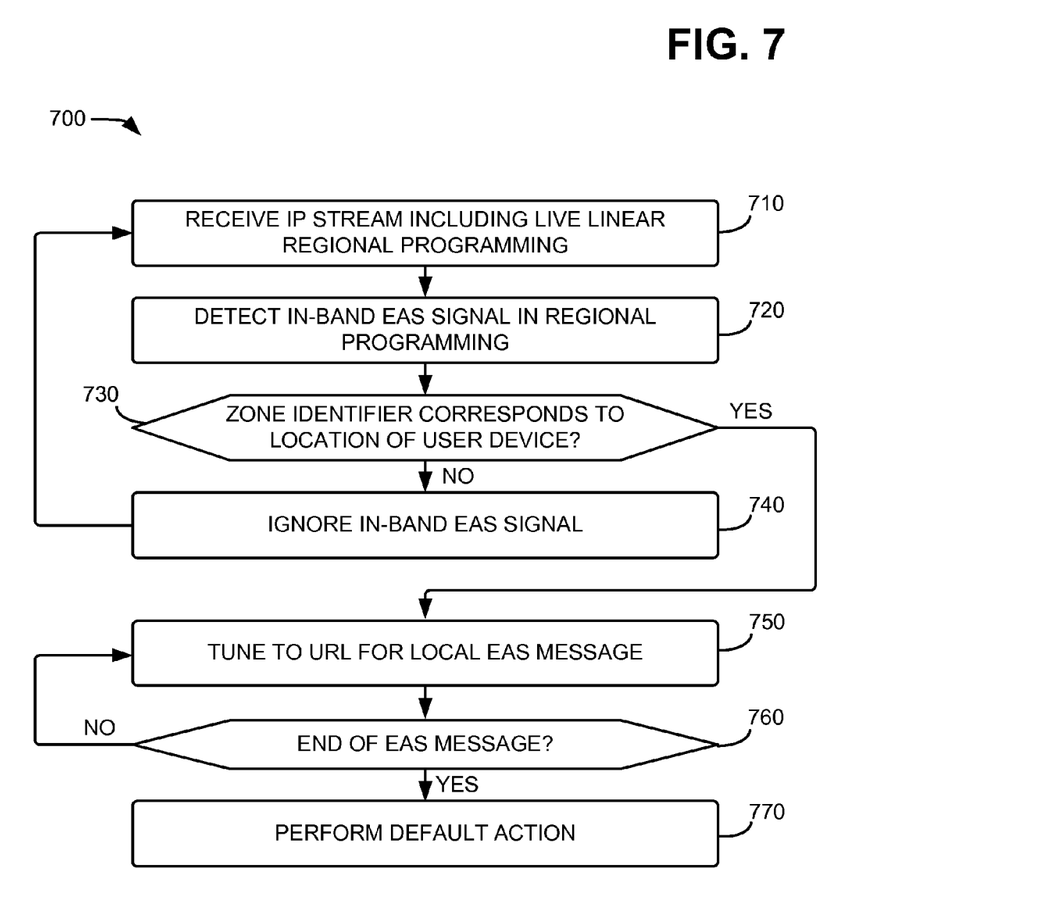
FIG. 7 is a flow diagram of an exemplary process for presenting local EAS messages on OTT clients.

FIG. 7 is a flow diagram of an exemplary process 700 for presenting local EAS messages on OTT clients. In one implementation, process 700 may be performed by user device 170. In other implementations, process 700 may be performed by user device 170 in conjunction with one or more devices from provider network 105.

Process 700 may include receiving an IP stream including live linear regional programming (block 710) and detecting an in-band EAS signal in the regional programming (block 720). For example, presenting OTT content, user device 170 may receive the requested regional programming (originating from regional program content 524) from originating server 568. User device 170 may scan OTT content streams for embedded EAS message signals (e.g., regional SCTE-18 message 532).

Process 700 may further include determining if a zone identifier in the in-band EAS signal corresponds to a location of the user device (block 730). For example, if user device 170 identifies an embedded EAS signal, user device 170 may determine if there is a relevant FIPS code for the current location of user device 170. A relevant FIPS code may be considered one that matches or is otherwise associated with a location of user device 170.

If the zone identifier in the in-band EAS signal does not correspond to the location of the user device (block 730—NO), the in-band EAS signal is ignored (block 740). If the zone identifier in the in-band EAS signal corresponds to the location of the user device (block 730—YES), process 700 may include tuning to a URL for the local EAS message (block 750). For example, if there is no relevant FIPS code, the EAS message can be ignored by the user device 170. If there is a relevant FIPS code, the user device 170 may identify the URL from the private descriptor field of the embedded EAS signal and access that URL to present emergency message content from origin server 568. The URL may provide content from audio/video MPEG/UDP stream 538.

Process 700 may also include determining if an end of the EAS message has been reached (block 760). For example, emergency message content from origin server 568 may also include in-band EAS signals, such as SCTE-18 information or other headers. The in-band signals may indicate an end of an EAS video/audio presentation.

If an end of the EAS message has not been reached (block 760—NO), the user device may remain tuned to the URL for the local EAS message (block 750). If an end of the EAS message has been reached (block 760—YES), process 700 may include performing a default action (block 770). For example, an OTT client on user device 170 may perform a default action to return to the channel/stream previously being presented to the user (e.g., before the emergency content), return to a home screen for the IMG, or providing an option screen for a user to select between the IMG and the previous channel.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 6 and 7, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component," "logic," or "system" that performs one or more functions. These may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a zone headend device for a local zone, a local emergency alert service (EAS) message that is intended for a particular geographic locality;
   processing, by the zone headend device, the local EAS message for delivery over a television conditional access system;
   sending, by a regional headend device for a region of multiple zones including the local zone, a polling signal to the zone headend device;
   receiving, by the zone headend device and from the regional headend device, a response to the polling signal indicating that a local EAS message has been received;
   sending, by the regional headend device and to the zone headend device, a first request for the local EAS message;
   sending, by the regional headend device, another polling signal to another zone headend device for another local zone;
   receiving, by the regional headend device and from the other zone headend device, a response to the other polling signal indicating that another local EAS message has been received;
   sending, by the regional headend device and to the other zone headend device, a second request for the other local EAS message;
   receiving, by the regional headend device, the local EAS message, in response to the first request, and the other local EAS message, in response to the second request; and
   processing, by the regional headend device, the local EAS message and the other local EAS message for in-band delivery with regional programming for broadcast quadrature amplitude modulation (QAM) and over-the-top streaming;
   receiving, by the regional headend device, a regional EAS message from an emergency message source;
   processing, by the regional headend device, the regional EAS message for in-band delivery with regional programming for over-the-top streaming;
   sending, by the regional headend device, the regional EAS message to a national headend device for multiple regions including the region;
   receiving, by the national headend device, the regional EAS message; and
   processing, by the national headend device, regional EAS message and other regional EAS messages for in-band delivery with live linear national programming for over-the-top streaming,
   wherein each of the zone headend device, the regional headend device, and the national headend device are different devices.

2. The method of claim 1, further comprising:
   sending, by the regional headend device, an aggregate of the local EAS message and the other local EAS message to the national headend device;
   receiving, by the national headend device, the aggregate from the regional headend device and another aggregate of EAS messages from another regional headend device; and
   processing, by the national headend device, the aggregate and the other aggregate for in-band delivery with live linear national programming for over-the-top streaming.

3. The method of claim 2, wherein the regional programming for over-the-top streaming and the national programming for over-the-top streaming include live linear content.

4. The method of claim 1, wherein the processing, by the regional headend device, further comprises:
   generating a first in-band signal for the local EAS message that includes a first zone identifier and a first universal resource locator (URL) for audio and video content corresponding to the local EAS message, or
   generating a second in-band signal for the other local EAS message that includes a second zone identifier and a second URL for audio and video content corresponding to the other local EAS message.

5. The method of claim 4, wherein the processing, by the regional headend device, further comprises:
   providing, for retrieval by a user device, video and audio content corresponding to the local EAS message and the first in-band signal, and
   providing, for retrieval by another OTT client, video and audio content corresponding to the other local EAS message and the second in-band signal.

6. The method of claim 4, further comprising:
   receiving, by a user device and as an Internet Protocol (IP) stream via a public network, the regional programming;
   detecting, by the user device, the first in-band signal;
   ignoring, by the user device, the first in-band signal when the first zone identifier does not correspond to a zone where the user device is located; and
   tuning, by the user device, to the first URL when the first zone identifier corresponds to the zone where the user device is located.

7. The method of claim 1, wherein the sending, by the zone headend device, the local EAS message includes:
   sending the local EAS message via common alerting protocol (CAP).

8. The method of claim 1, wherein the processing by the zone headend device, includes:
   processing the local EAS message for out-of-band delivery via a conditional access system carousel, or
   processing the local EAS message for in-band delivery with live linear regional television programming.

9. The method of claim 1, wherein the regional EAS message comprises an emergency action notification (EAN) message.

10. A system, comprising:
   multiple zone encoder/decoder devices, wherein each of the multiple zone encoder/decoder devices are configured to:
      receive a local emergency alert service (EAS) message that is associated with a local zone,
      process the local EAS message for delivery over a television conditional access system,
      receive a polling signal from a regional encoder/decoder device for a region of multiple zones including the local zone,
      respond to the polling signal when the local EAS message has been received, and
      send the local EAS message to the regional encoder/decoder;
   the regional encoder/decoder device configured to:
      send the polling signal to each of the multiple zone encoder/decoder devices,
      receive responses to the polling signal indicating that local EAS messages have been received,
      send, to each of the multiple zone encoder/decoder devices that provided a response to the polling signal, a request for a local EAS message,
      receive the local EAS messages from each of the multiple zone encoder/decoder devices,
      process the local EAS messages for in-band delivery with regional programming for over-the-top streaming, and
      send an aggregate of the local EAS messages to a national encoder/decoder device for multiple regions including the region, the national encoder/decoder device being a different device than the regional encoder/decoder device; and
   the national encoder/decoder device configured to:
      receive the aggregate from the regional encoder/decoder device and another aggregate of EAS messages from another regional encoder/decoder device, and
      process the aggregate and the other aggregate for in-band delivery with national programming for over-the-top streaming.

11. The system of claim 10, wherein the regional encoder/decoder device is further configured to:
   receive a regional EAS message from an emergency message source,
   process the regional EAS message for in-band delivery with regional programming for over-the-top streaming, and
   send the regional EAS message to the national encoder/decoder device; and
   wherein the national encoder/decoder device is further configured to:
   receive the regional EAS message from the regional encoder/decoder device; and
   process the regional EAS message and other regional EAS messages for in-band delivery with national programming for over-the-top streaming.

12. The system of claim 11, wherein the regional programming for over-the-top streaming and the national programming for over-the-top streaming include live linear content.

13. The system of claim 10, wherein when processing the local EAS messages for in-band delivery with regional programming for over-the-top streaming, the regional encoder/decoder device is further configured to:
   generate a first in-band signal for a first one of the local EAS messages that includes a first zone identifier and a first universal resource locator (URL) for audio and video content corresponding to the first one of the local EAS messages, and
   generate a second in-band signal for a second one of the local EAS messages that includes a second zone identifier and a second URL for audio and video content corresponding to the second one of the local EAS messages.

14. The system of claim 10, further comprising:
   a regional multiplexer device configured to:
      receive the processed local EAS messages from the regional encoder/decoder device and add each of the processed local EAS messages to the regional programming.

* * * * *